Nov. 28, 1961 M. GLICKSMAN 3,011,069

SEMI-CONDUCTOR FREQUENCY MULTIPLIER USING THE HALL EFFECT

Filed Jan. 29, 1958 3 Sheets-Sheet 1

INVENTOR.
MAURICE GLICKSMAN
BY
Charles H. Brown
ATTORNEY

SEMI-CONDUCTOR FREQUENCY MULTIPLIER USING THE HALL EFFECT

INVENTOR.
MAURICE GLICKSMAN
BY Charles H. Brown
ATTORNEY

SEMI-CONDUCTOR FREQUENCY MULTIPLIER USING THE HALL EFFECT

Filed Jan. 29, 1958 3 Sheets-Sheet 3

INVENTOR.
MAURICE GLICKSMAN
BY
Charles H. Brown
ATTORNEY 3,011,069
SEMI-CONDUCTOR FREQUENCY MULTIPLIER USING THE HALL EFFECT Maurice Glicksman, Princeton, N.J., assignor to Radio Corporation of America, a corporation of Delaware Filed Jan. 29, 1958, Ser. No. 711,881
10 Claims. (Cl. 307—88.5)

The invention relates to frequency multiplier circuit arrangements. Particularly, the invention relates to a frequency multiplier circuit arrangement using a body of semiconductor material.

Frequency multiplier circuits are known in the art which use complicated arrangements including electron tubes, transistors or other similar multi-electrode current conducting devices. Such arrangements require a tuned resonant circuit in the input, output or in both the input and output circuits thereof. The multiplier circuit is set by one or more of the tuned circuits to respond only to a signal of a predetermined frequency and to translate only the signal of the predetermined frequency into a signal of a desired higher frequency. It is necessary that the tuned circuits used be retuned and/or realigned upon each change in the frequency of the signal applied to the multiplier circuit so as to cause the multiplier circuit to be responsive thereto to perform the desired frequency multiplication. Such multiplier circuits are not capable of operation over a band or range of frequencies without a retuning or similar control operation.

The necessity for retuning limits the application of such multiplier circuit arrangements and reduces their versatility. In addition, the requirement of retuning and/or realigning the circuit arrangements according to even a slight change in the frequency of operation adds to the operational and maintenance problems encountered in the use of such arrangements. Such retuning and readjusting operations are often highly critical, adding to the complexity of the arrangements. It is desirable to provide a frequency multiplier capable of operation in response to an input signal of any given frequency in a range of frequencies to translate the input signal into an output signal of a frequency equal to the given frequency multiplied by a desired factor, without requiring a retuning of any part of the frequency multiplier circuit. In view of the trend towards a reduction in the size and weight of equipment, it is further desirable that the frequency multiplier be simple in construction and operation, requiring a minimum number of parts.

It is, therefore, a general object of the invention to provide an improved frequency multiplier, avoiding the disadvantages outlined above.

Another object is to provide an improved frequency multiplier using a body of semiconductor material arranged and operated to perform the frequency multiplication.

Another object is to provide a novel frequency multiplier by the control of electron and/or hole mobilities in a body of semiconductor material.

A further object is to provide a novel frequency multiplier including a body of semiconductor material to translate a signal of any given frequency in a range of frequencies into an output signal of the given frequency multiplied by a desired factor, without requiring a retuning of the frequency multiplier upon a change in the frequency of the input signal.

A still further object is to provide an improved frequency multiplier which is simple in operation and in construction, requiring a minimum number of parts.

Briefly, the objects of the invention are accomplished by a frequency multiplier circuit arrangement including a body of semiconductor material. It is understood in the art that certain semiconductor materials have a property by which an electrical potential is produced at laterally spaced points along one axis of the material when a current is passed through an orthogonal axis thereof under the influence of a mutually orthogonal magnetic field. This electrical property of these materials has become known as the Hall effect. The output or Hall voltage produced as a result of the Hall effect is generally proportional to the product of the magnetic field strength and the intensity of the current passed through the body of semiconductor material or Hall effect element.

It is believed that current flow takes place through a semiconductor material due to the presence therein of mobile electric charge carriers. The conduction phenomenon is felt to occur as a result of a stream of mobile negative and/or positive carriers which correspond respectively to a stream of electrons and electron vacancies defined as holes in the semiconductor material.

The invention utilizes a body of semiconductor material exhibiting a characteristic dependence of the Hall voltage on an applied electric field and/or magnetic field. The semiconductor material is one in which both mobile electrons and holes present therein contribute to conductivity. Examples of materials which may be used are indium antimonide and indium arsenide. Other suitable materials are available. The production of materials having the above-mentioned characteristics is known and reference thereto may be found in the art. The present invention is not limited to the use of any particular material and is not concerned per se with the actual production of such materials.

Upon the application of an electric field to a semiconductor material, the charge carirers therein acquire a net velocity (drift velocity) in the direction of the field given by the mobility times the applied electric field. The electron and hole mobilities are equal to the net velocity thereof over the applied electric field. A semiconductor material is selected, such as one of the materials given by way of example above, that exhibits a mobility ratio (ratio of electron mobility to hole mobility) different than one and, preferably, a material is selected that has a mobility ratio considerably greater or less than one. Either the magnetic field or the electric field applied to the material is varied according to the frequency of an alternating current input signal. The disparate electron and hole mobilities are affected differently by the application of the changing magnetic or electric field to the semiconductor material; that is, the electron and hole mobilities are disproportionately altered by the change in field, resulting in a changing mobility ratio. The Hall voltage changes sign according to the change in the mobility ratio so that the Hall voltage changes sign in one direction as the field is increased and in the reverse direction when the field is decreased. This action results in the production of an output signal represented by the Hall voltage having a frequency equal to a given multiple of the frequency of the input signal applied to the frequency multiplier of the invention. A frequency multiplier is disclosed which functions without tuned circuits and similar additional circuitry, avoiding the difficulties and disadvantages normally encountered in the use of such circuits.

A more detailed description of the invention will now be given with reference to the accompanying drawing in which.

Figure 1:
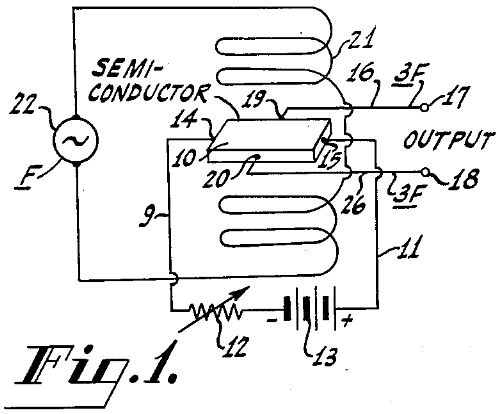
FIGURE 1 is a circuit diagram of one embodiment of a frequency multiplier constructed according to the invention.

Referring to FIGURE 1, there is shown a body (or crystal) 10 constructed of a material capable of operation as a Hall effect element. Particularly, the body 10 is constructed of a material which exhibits a characteristic dependence of the Hall voltage on an applied electric and/or magnetic field. A semiconductor material such as indium antimonide and indium arsenide is preferably used in which both electrons and holes (electron vacancies) contribute to the conduction.

The body 10 may be of any shape and size according to the requirements of a particular application. While the body 10 is shown and will be described as being rectangular in shape, it is to be understood that the body 10 may be of any other suitable shape as, for example, a disc. By way of example only, the body 10 may be two millimeters wide by one millimeter deep and one centimeter (or ten millimeters) in length. The size will depend on the shape of the body 10, the material used, and so on.

A first electrical path including lead 9, variable resistor 12, a source of constant unidirectional potential represented by a battery 13 and lead 11 is connected in series across one axis of the body 10. As shown in FIGURE 1, the leads 9 and 11 are connected to opposite ends of the body 10 at points 14, 15 located along the long dimension or longitudinal axis thereof by any of known techniques. The connections to the points 14, 15 may be made, for example, by soldering to the body 10 or to deposited metal coatings on the body 10. A second electrical path or output circuit including lead 16, terminals 17, 18 and lead 26 is connected across the width of the body 10 at right angles to the first electrical path defined above. The leads 16 and 26 may be connected to the body 10 at points 19, 20 by the same techniques used to connect leads 9 and 11 to the body 10.

A third electrical path including an inductance or winding 21 and a source 22 of an alternating current signal of frequency F is provided. The body 10 is located by any suitable means within the turns of the winding 21 so that the body 10 is located in a magnetic field having a direction at right angles to both the first and second electrical paths defined above. While a winding 21 has been shown for purposes of description, the magnetic field may be produced in any known manner. For example, the winding 21 may be wound on a magnet or magnetic member having an air gap, the body 10 being positioned in the air gap. Other known arrangements for producing a magnetic field may be used.

The semiconductor body 10 is constructed of a material in which the mobility ratio or ratio of electron mobility (average electron mobility) to hole mobility (average hole mobility) is greater or less than one. It will be assumed for the moment that a material such as indium antimonide is used which has a mobility ratio greater than one. That is, the electron mobility is greater than the hole mobility. When the body 10 is placed in an electric field and in a magnetic field in the manner shown in FIGURE 1, the holes and electrons within the body 10 having mobility or, in other words, drifting in the electric field, will move towards a side or surface level of the body 10. The direction of the drift of the holes and electrons depends on the direction of the direct current through the magnetic field. Therefore, the polarity of the Hall voltage available at terminals 17, 18 depends on the direction of the direct current through the body 10.

The Hall voltage $V_H$ is proportional to the direction of the direct current I and the direction of the magnetic field H. In other words, the Hall effect is dependent upon the electric field and the magnetic field and changes sign if either the electric field or the magnetic field changes sign, but remains the same if both the electric field and the magnetic field change sign In the operation of the invention, an alternating current signal of frequency F is applied from source 22 to the winding 21. The Hall voltage (in volts) depends on the current I (in amperes), the magnetic field H (in gauss), the crystal thickness T (in centimeters) in the direction of H and the Hall coefficient $R_H$ (in centimeters cubed per Coulomb), according to the equation:

$$V_H=\frac{10^{-8}R_H IH}{T} \qquad (1)$$

The Hall coefficient is determined by the equation:

$$R_H=-\frac{Anb^2-p}{e(nb+p)^2} \qquad (2)$$

where $n$ is the electron concentration,
$p$ is the hole concentration,
$b$ is the mobility ratio $\frac{\mu_n}{\mu_p}$ or ratio of electron mobility to hole mobility,
$e$ is the electronic charge, and
A is a factor depending on temperature, condition of material and having a possibly slight dependence on the magnetic field H. The factor A will usually have a value between 1 and 2, and the operation of the invention is relatively unaffected by the value thereof. From an examination of Equations 1 and 2, it can be seen that the sign of the Hall coefficient $R_H$ and, therefore, the sign of the Hall voltage $V_H$ can be made to change by a change in the relative magnitude of the quantity $nb^2$ in relation to the quantity $p$. If $$nb^2>p \text{ then } R_H<0$$

if $$nb^2<p \text{ then } R_H>0$$

and if $$nb^2=p \text{ then } R_H=0$$

In the application where the mobility ratio of the material used for the body 10 is greater than one, as has been assumed, the concentration of the mobile electrons and holes is controlled so that in the absence of a magnetic field or $H=0$ the quantity $nb^2$ (the electron concentration times the square of the mobility ratio) is greater than the quantity $p$ (hole concentration). If the condition does not exist in the body 10, the condition may be accomplished by a number of techniques known in the art. One of the conventional procedures is to dope the material of the body 10 by the addition of impurities thereto. Such impurities have been defined as donor and acceptor impurity substances. Donor impurities are defined as materials by which an excess of electrons can be made free to move about within the body 10. That is, the donor impurities can be made to give up electrons. By virtue of the negative charge which the electrons bear, the stream of electrons made available supplement the current flow through the body 10. Acceptor impurities are defined as materials by which positively charged regions or holes into which electrons flow can be created. The concentration of holes and electrons can also be determined at least in part by temperature. It has been shown in the art that as the temperature of a semiconductor material is changed, the impurity atoms or substances exhibit a corresponding change in their readiness to give up electrons in the case of the donor impurities and to provide holes in the case of acceptor impurities. Therefore, the concentration of the holes and electrons can be controlled as a function of the temperature of the body 10. Since there are available in the art a number of references describing procedures for doping and otherwise determining the concentration of electrons and holes in a semiconductor body, a detailed description at this time is believed to be unnecessary. By way of example, a discussion of the procedures involved may be found in "Electrons and Holes in Semiconductors" by Shockley, published by Van Nostrand Company.

As the magnetic field H is changed according to the frequency of the alternating current signal applied to the body 10 from the source 22, the magnetoresistance affects the mobilities of the electrons and holes and the relative change in the mobilities of the electrons and holes at low or moderate magnetic fields is believed to obey a relationship represented by the following equation:

$$\frac{\Delta\mu}{\mu}=-C(\mu H)^2 \qquad (3)$$

where $\Delta\mu$ is the change in the mobility of the electrons or holes in the presence of the magnetic field H, $\mu$ is the mobility of the electrons or holes in the presence of a zero magnetic field H, H is the magnetic field, and C is a constant.

The relative change in the ratio of electron mobility to hole mobility is represented approximately by the equation:

$$\frac{\Delta b}{b}=\frac{\Delta\mu_n}{\mu_n}-\frac{\Delta\mu_p}{\mu_p} \qquad (4)$$

where $\Delta b$ is the change in the mobility ratio in the presence of the magnetic field H, $b$ is the mobility ratio in the presence of a zero magnetic field H, $\Delta\mu_n$ is the change in the electron mobility in the presence of the magnetic field H, $\mu_n$ is the electron mobility in the presence of a zero magnetic field H, $\Delta\mu_p$ is the change in the hole mobility in the presence of the magnetic field H, and $\mu_p$ is the hole mobility in the presence of a zero magnetic field H.

By analyzing Equations 3 and 4, it can be shown that the relative change in the mobility ratio is represented approximately by the equation:

$$\frac{\Delta b}{b}=-C(\mu_n^2-\mu_p^2)H^2 \qquad (5)$$

From an examination of Equation 5, it is apparent that if the electron mobility $\mu_n$ is greater than the hole mobility $\mu_p$ for the material used in the body 10 so that the quantity $\mu_n^2-\mu_p^2$ is, in effect, positive, the quantity $-C(\mu_n^2-\mu_p^2)H^2$ will become an increasingly negatvie amount as the value of the magnetic field H is increased. In other words, the mobility ratio $b$ will decrease. While the electron mobility $\mu_n$ will remain greater than the hole mobility $\mu_p$, both the electron mobility $\mu_n$ and hole mobility $\mu_p$ decrease.

Figure 2:
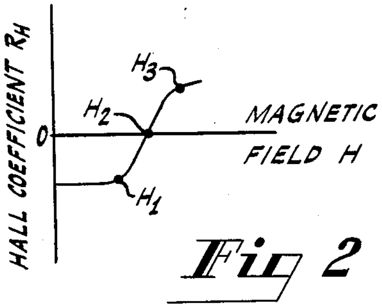
FIGURES 2, 3 and 4 are curves useful in describing the operation of the embodiment of the invention given in FIGURE 1.

It has been assumed that the body 10 is constructed of a material having a mobility ratio $b$ greater than one or, in other words, that the electron mobility is greater than the hole mobility. It has further been assumed that the concentration of the mobile electrons and holes in the body 10 has been set by the procedures outlined above so that the quantity $nb^2$ (electron concentration times the square of the mobility ratio) is greater than the quantity $p$ (hole concentration). Referring to the Equation 2, it can be seen that the Hall coefficient $R_H$ will at zero magnetic field H be a negative quantity since $nb^2$ is larger than $p$. As shown in FIGURE 2, as the magnetic field H is increased from zero to a value $H_1$ according to the alternating current signal applied to the winding 21 from the source 22, the mobility ratio $b$ is decreased accordnig to the Equation 5 discussed above. The quantity $nb^2$ decreases and is more closely equal to the quantity $p$, and the Hall coefficient $R_H$ becomes more positive. At a value $H_2$ of the increasing magnetic field H, the mobility ratio $b$ decreases to a value such that the quantity $nb^2$ is equal to the quantity $p$. The Hall coefficient $R_H$ becomes equal to zero. When the magnetic field H increases to a value $H_3$, the mobility ratio $b$ has now decreased to a value such that the quantity $nb^2$ is less than the quantity $p$. The Hall coefficient $R_H$ is now a positive quantity.

Figure 3:
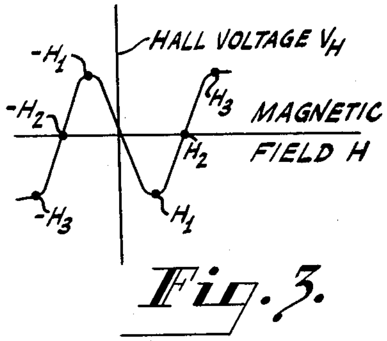

Referring to Equation 1, the sign of the Hall voltage $V_H$ is dependent upon the sign of the Hall coefficient $R_H$, the magnetic field H and the current I. By substituting the values of the Hall coefficient $R_H$ given in the curve of FIGURE 2 in the Equation 1, a curve as given in FIGURE 3 results. When the increasing magnetic field H is positive going during the positive half cycle of the alternating current signal and of the value $H_1$, the negative Hall coefficient $R_H$ causes the Hall voltage $V_H$ to be negative. When the Hall coefficient $R_H$ equals zero at the value $H_2$ of the magnetic field H, the Hall voltage $V_H$ is zero. When the magnetic field H is of a value $H_3$, the Hall coefficient $R_H$ is positive and the Hall voltage $V_H$ is positive. The Hall voltage $V_H$ will change sign in the reverse direction as the magnetic field H becomes less positive. During the negative half cycle of the incoming alternating current signal supplied by the source 22, the magnetic field H is negative. Therefore, when the magnetic field H is of a value $H_1$, the magnetic field H and the Hall coefficient $R_H$ being negative, the Hall voltage $V_H$ is positive, and so on.

Figure 4:
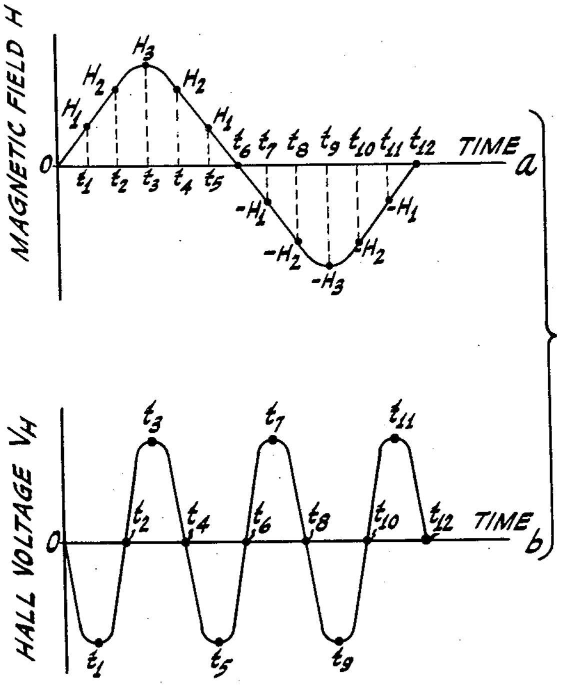

The curve given in FIGURE 4 represents a comparison of the change in sign of the magnetic field H according to one typical cycle of the alternating current signal of frequency F supplied by source 22, FIGURE 4*a*, and the Hall voltage $V_H$ or output signal available at the output terminals 17 and 18, FIGURE 4*b*, for application to a utilization circuit. The incoming signal is set so as to have a maximum amplitude corresponding to the magnetic field value $H_3$, $-H_3$ shown in the curves of FIGURES 2 and 3. From the information provided from the curve in FIGURE 3, it can be seen that when the magnetic field H is of a value $H_1$ at time $t_1$ of the curve in FIGURE 4*a*, the Hall voltage $V_H$ is negative as shown in FIGURE 4*b*. At time $t_2$ when the magnetic field H equals the value $H_2$, the Hall voltage $V_H$ is zero. When the magnetic field H is of a value $H_3$ at time $t_3$, the Hall voltage $V_H$ is positive, and so on. At times $t_6$ and $t_{12}$, the magnetic field H is zero and the Hall voltage $V_H$ is also zero. The outgoing signal shown in FIGURE 4*b* available at terminals 17 and 18 is of a frequency 3F or is three times the frequency F of the incoming signal shown in FIGURE 4*a*.

In the example given above, the electron and hole concentration in the body 10 should be determined so that the change in the mobility ratio $b$ due to the change in the magnetic field H according to Equation 5 is large enough to force the quantity $nb_2$ to decrease to values less than the quantity $p$. By controlling the values of the electron and hole concentration, the Hall coefficient $R_H$ is made to change sign as the magnetic field H is changed between the values $H_1$ to $H_3$ and $-H_1$ to $-H_3$, resulting in a corresponding change in the sign or polarity of the Hall voltage $V_H$. As shown in FIGURE 4, this action results in an output signal being produced by the embodiment of the invention given in FIGURE 1 having a frequency three times the frequency of the input alternating current signal supplied by the source 22.

By way of example only, a body 10 constructed of indium antimonide doped with 1.7 times $10^{15}$ per cubic centimeter acceptors cadmium or zinc was operated at 155° Kelvin. The Hall coefficient $R_H$ was found to change sign at the magnetic field value $H_2$ equal to 1500 gauss. The Hall coefficient $R_H$ had a value of −5000 centimeters cubed per coulomb at the magnetic field value equal to 750 gauss and a value of +3000 centimeters cubed per coulomb at the magnetic field value equal to 3000 gauss. In other words, a relatively wide range of operation was found to occur with a large available output.

In the previous discussion, it has been assumed that the material used for the body 10 has a mobility ratio greater than one. However, materials may be used in which the hole mobility is greater than the electron mobility such that the mobility ratio is less than one. In such a case, the concentration of the electrons and holes in the material of the body 10 are determined so that the electron concentration times the square of the mobility ratio or quantity $nb^2$ is less than the hole concentration or quantity $p$. Since the quantity $nb^2-p$ of Equation 2 is now negative, the Hall coefficient $R_H$ is a positive value at a zero magnetic field H. As the hole mobility is greater than the electron mobility, the quantity $-C(\mu_n^2-\mu_p^2)$ given in Equation 5 is a positive quantity. As the magnetic field H increases, the mobility ratio $b$ becomes more positive or increases. The quantity $nb^2$ will increase until it is equal to the quantity $p$ at which time the Hall coefficient $R_H$ is equal to zero. As the magnetic field H and, therefore, the mobility ratio $b$ increase further, the quantity $nb^2$ becomes greater than the quantity $p$ and the Hall coefficient $R_H$ becomes negative. The resulting curve of the Hall coefficient $R_H$ is similar to that given in FIGURE 2 but reversed in polarity. Since the Hall voltage $V_H$ is determined according to the change in sign of the Hall coefficient $R_H$, a curve for the resulting change in the Hall voltage $V_H$ is similar to the curve given in FIGURE 3 but of opposite polarity. That is, for the value $H_1$ of the magnetic field H, the Hall voltage $V_H$ is positive. For the value $-H_1$ of the magnetic field H, the Hall voltage $V_H$ is negative, and so on. The invention will operate to produce an output signal having a frequency three times the frequency of the alternating current signal supplied by the source 22 and one hundred and eighty degrees out of phase with the signal shown in FIGURE 4*b*.

A frequency multiplier is disclosed capable of producing an output signal having a frequency three times the frequency of the input signal. No tuned resonant circuits are required, permitting the operation of the invention over a wide range of frequencies without further adjustment once the invention has been placed in operation. The frequency of operation will be limited primarily by the necessary input inductance which is determined by the sensitivity of the material of body 10 to the magnetic fields. The more efficient the magnetic field H is made, the higher are the frequencies of operation obtainable.

Figures 5, 6, 7, 8, 9:
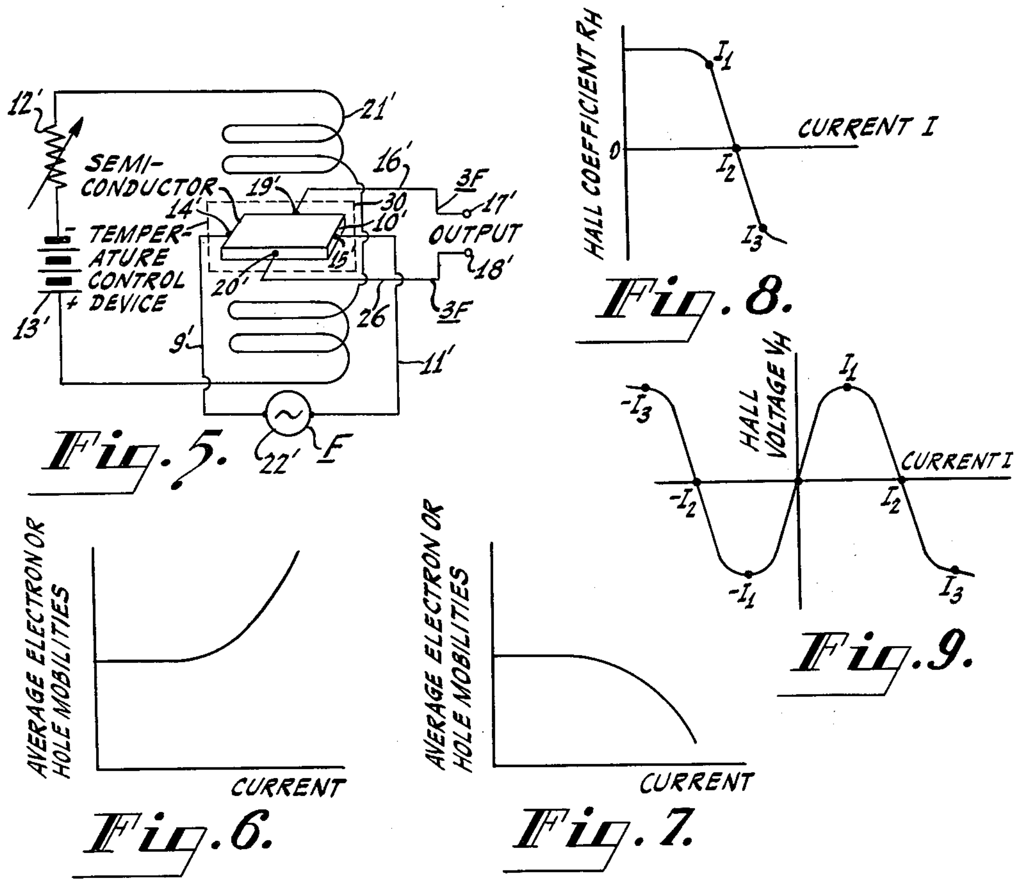
FIGURE 5 is a circuit diagram of a further embodiment of a frequency multiplier constructed according to the invention.
FIGURES 6 through 13 are curves useful in describing the operation of the embodiment of the invention given in FIGURE 5.

In the operation of the embodiment of the invention given in FIGURE 1, the magnetic field H is varied according to the alternating current signal supplied by the source 22. FIGURE 5 shows a further embodiment of the invention in which the electric field E applied to the crystal body is varied according to the alternating current input signal. Since the various circuit components given in FIGURE 5 are similar to the corresponding circuit components found in FIGURE 1, the circuit components given in FIGURE 5 have been given the same reference numerals primed. The first electrical path includes the source 22' and leads 9' and 11' connected to the body 10' at points 14' and 15'. A further electrical path includes the source of unidirectional potential or battery 13', resistor 12' and the winding 21'. As mentioned in connection with FIGURE 1, the winding 21' may in practice be any known means for applying a magnetic field to the body 10'.

As in the embodiment given in FIGURE 1, the body 10' is constructed preferably of a semiconductor material having a characteristic dependence of the Hall voltage on the applied electric and/or magnetic field. The material is one in which both electrons and holes are present and in which the mobility ratio $b$ is greater or less than one. That is, the electron mobility is different from the hole mobility. For example, materials such as indium antimonide and indium arsenide previously referred to may be used. As the electric field E is applied to the body 10' via lead 11' in the presence of the magnetic field H provided by the winding 21', energy is transferred to the electric charge carriers (holes and electrons). This energy is, in turn, transferred from the chrage carriers to the atom lattice of the crystal body 10', causing the temperature of the body 10' to increase. A condition of thermal equilibrium exists in which the average energy of the charge carriers corresponds to the temperature of the crystal or body 10'. As the rate of energy transferred to the charge carriers increases due to an increase in the current, the temperature of the body increases a corresponding amount, and so on. When the electric field E becomes of a higher magnitude depending upon the material used, however, energy is transferred to the charge carriers from the electric field E more rapidly than the energy can be transferred from the charge carriers to the atom lattice of body 10'. When this occurs, the charge carriers are referred to in the art as being "hot," since the energy of the charge carriers is greater than is the case for charge carriers in the condition of thermal equilibrium with the atom lattice of the body 10'. In the "hot" condition, the energy and, therefore, the mobility of the charge carriers becomes a function of the applied electric field.

This action results in a change in the average mobilities of the charge carriers. As shown in FIGURE 6, for one condition of the material of the body 10', the electron and hole mobilities increase as the current over lead 11' and, therefore, the electric field E applied to the body 10' is increased. For a second condition of the material of the body 10', the electron and hole mobilities decrease as the current is increased in the manner shown in FIGURE 7. The first condition in which the electron and hole mobilities increase results from a phenomenon known in the art as scattering by ionized impurities, while the second condition in which the electron and hole mobilities decrease results from a phenomenon known in the art as scattering by thermal vibration of the atoms in the lattice. The above characteristics of semi-conductor materials under the conditions described and the change in mobilities is understood in the art. Since a number of references are available in the art, it is felt to be unnecessary to discuss these characteristics in detail at this time. By way of example, reference is made to an article "High Electric Field Effects in Semiconductors" by J. B. Gunn found in vol. 2, "Progress in Semiconductors," edited by Gibson, Aigrain and Burgess and published by Heywood and Company, for a discussion of the above-mentioned phenomena.

The electron and hole mobilities increase upon an increase in the applied electric field E in materials having a relatively high concentration of atoms of donor and acceptor impurity materials. The charge carriers, holes and electrons, collide primarily with the ionized atoms of the impurity substances. The average mobilities of the electrons and holes are thus determined by these scatterings or collisions. As is known, this type of scattering is strongly dependent on the energy of the electrons or holes. The strength of the scattering decreases as the energy of the electrons or holes increases. Thus, as the electrons or holes become "hot" (their energy increases), they make fewer collisions and their mobility increases. The average electron or hole mobilities increase as the current supplied by the source 22' increases in the manner shown in FIGURE 6.

In materials used for the body 10' in which there is a relatively small concentration of atoms of acceptor and donor impurity materials, the mobile holes and electrons present in the body 10' are primarily scattered by the thermal vibrations of the atoms in the lattice of the body 10'. That is, the atoms in the lattice tend to move or vibrate as a function of their energy, altering the distance between atoms in the lattice. As a result, the electrons and holes collide with these vibrating atoms. The average mobilities of the electrons and holes are determined by these collisions or scatterings. As is known, this type of scattering depends on the energy of the electrons or holes. As the energy of the electrons or holes increases, the scattering increases. Thus, as the electrons or holes become "hot," they make more collisions and their mobility decreases. The average electron and hole mobilities decrease in the manner shown in FIGURE 7.

It will first be assumed that a material is used for the body 10' having the characteristic shown in FIGURE 6, wherein the electron and hole mobilities increase as current increases. It will be further assumed that the material of the body 10' is of the type such as indium antimonide in which the average electron mobility is greater than the average hole mobility (the mobility ratio $b$ is greater than one). If the condition does not exist in the material of the body 10', the electron and hole concentrations are controlled by one of the techniques referred to in connection with FIGURE 1 so that the electron concentration times the square of the mobility ratio, $nb^2$, is less than the hole concentration $p$. Referring to Equation 2, the quantity $nb^2-p$ will be negative and the Hall coefficient $R_H$ is positive at a zero electric field E. As the current I increases causing the applied electric field E to increase, the electron mobility being greater than the hole mobility will follow the curve given in FIGURE 6. Since the holes are of lower mobility, the effect of the electric field E on the holes is constant up to much higher values of the electric field. The mobility ratio $b$ or ratio of electron mobility to hole mobility will thus increase. As a result the quantity $nb^2$ will increase so that at a value $I_1$ (of the current the Hall coefficient $R_H$ is positive in the manner shown in the curve of FIGURE 8. At a value $I_2$ of the current, the quantity $nb^2$ is equal to the quantity $p$ and the Hall coefficient $R_H$ equals zero. When the current is of a value $I_3$, the quantity $nb^2$ is greater than the quantity $p$ and the Hall coefficient $R_H$ is negative. The concentration of electrons and holes should be determined so that the change in the mobility ratio $b$ due to the change in current I is large enough to force the quantity $nb^2$ to increase to a value greater than that of the quantity $p$.

Placing the values of the Hall coefficient $R_H$ in the Equation 1 for the Hall voltage $V_H$, the Hall voltage $V_H$ will change sign in the manner shown in the curve of FIGURE 9. When the increasing current I is positive during the positive half cycle of the alternating current signal supplied by the source 22' and of the value $I_1$, the Hall voltage $V_H$ is positive since the Hall coefficient $R_H$ is positive. When the Hall coefficient $R_H$ is equal to zero at the value $I_2$ of the current I, the Hall voltage $V_H$ is equal to zero. At the value $I_3$ of the current I, the Hall coefficient $R_H$ is negative and the Hall voltage $V_H$ is negative. Upon the current I becoming negative during the negative half cycle of the alternating current signal supplied by the source 22', the current I is negative and the Hall coefficient $R_H$ is positive at the value $I_1$ of the current I, causing the Hall voltage $V_H$ to be negative, and so on.

Figure 10:
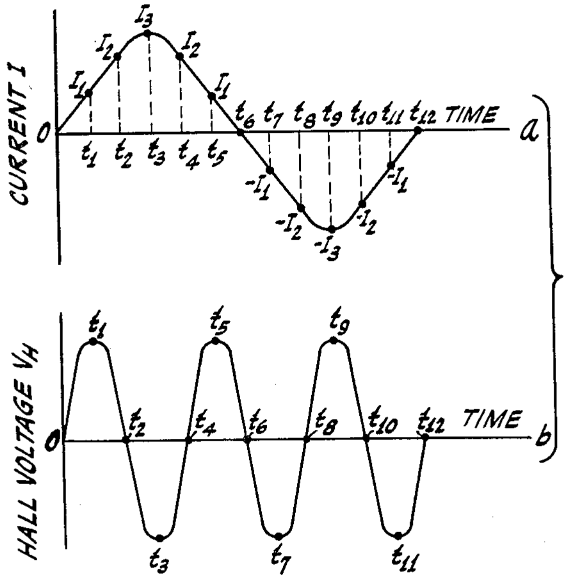

FIGURE 10 shows a comparison between one typical cycle of the alternating current signal supplied by the source 22', FIGURE 10*a*, and the output signal or Hall voltage $V_H$ available at the terminals 17' and 18' for application to a utilization circuit, FIGURE 10*b*. The alternating current signal is set to vary between the values $I_3$ and $-I_3$. At time $t_1$ of the cycle, the current I is of a value $I_1$, the Hall coefficient $R_H$ is positive and the Hall voltage $V_H$ is positive. At time $t_2$, the current I is of the value $I_2$, the Hall coefficient $R_H$ is equal to zero and the Hall voltage $V_H$ is equal to zero, and so on. At times $t_6$ and $t_{12}$ the current I is equal to zero and, thus, the Hall voltage $V_H$ is equal to zero. By the action described, a signal is available at the terminals 17' and 18' of a frequency 3F or three times the frequency F of the signal supplied by the source 22'.

Figure 11:
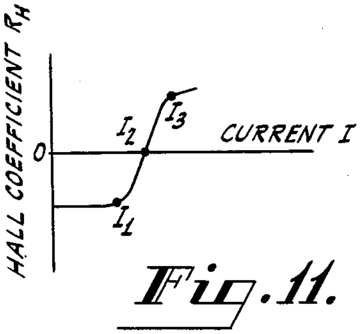
Figure 12:
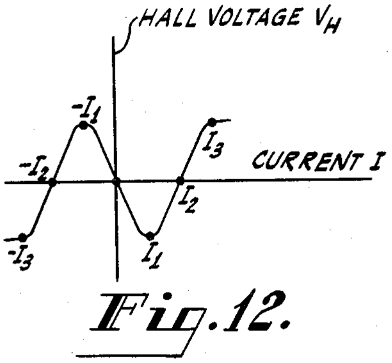

Instead of the electron and hole mobilities increasing as the current I increases, the material used for the body 10' may be characterized by a decrease in the mobilities as the current increases as shown in the curve of FIGURE 7 and described above. It will again be assumed that the material used for the body 10' has a mobility ratio $b$ greater than one. If the condition does not exist in the material of the body 10', the electron and hole concentrations are controlled by one of the techniques previously referred to so that the electron concentration times the square of the mobility ratio is greater than the hole concentration (or the quantity $nb^2-p$ of Equation 2 is positive). Since the quantity $nb^2-p$ is positive, Equation 2 provides a negative value for the Hall coefficient $R_H$ at a zero electric field E. As the current I is increased causing the applied electric field E to increase, the electron mobility decreases according to the curve given in FIGURE 7. As the holes are of lower mobility, the effect of the electric field E on the holes is constant up to much higher values of the electric field. Since the mobility ratio $b$ or ratio of electron mobility to hole mobility decreases, the quantity $nb^2$ decreases. As shown in FIGURE 11, the Hall coefficient $R_H$ is negative for the value $I_1$ of the current I, zero for the value $I_2$ of the current I and positive for the greater value of the current $I_3$. The concentration of electrons and holes should be determined so that the change in the mobility ratio $b$ due to the change in current I is large enough to force the quantity $nb^2$ to decrease to a value less than that of the quantity $p$. Substituting the values of the Hall coefficient $R_H$ in the Equation 1, a curve as shown in FIGURE 12 is provided. At the value $I_1$ of the current I, the Hall voltage $V_H$ is negative. At the value $I_2$ of the current I, the Hall voltage $V_H$ is equal to zero. When the current I is of a value $I_3$, the Hall voltage $V_H$ is positive, and so on.

Figure 13:
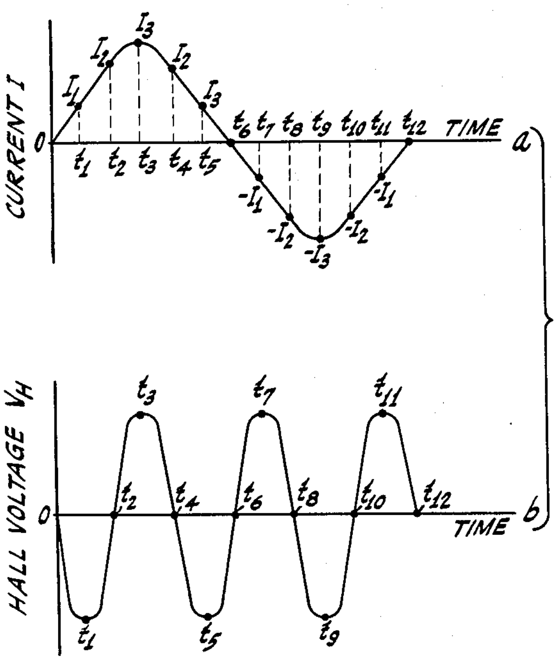

FIGURES 13*a* shows one typical cycle of the alternating current signal supplied by the source 22', and FIGURE 13*b* shows the output signal of Hall voltage $V_H$ available at the terminals 17', 18'. An output signal is produced having a frequency 3F or three times the frequency F of the alternating current signal supplied by the source 22'. Thus, it may be seen that materials exhibiting an increase in electron and hole mobilities as shown in FIGURE 6 or materials exhibiting a decrease in electron and hole mobilities as shown in FIGURE 7 may be used in the frequency multiplier constructed and operated according to the invention. Since the Hall coefficient $R_H$ changes sign in one direction for one case and in the opposite direction for the other case, the output signal produced in the one case will be one hundred and eighty degrees out of phase with the output signal produced in the other case.

In describing the embodiment of the invention given in FIGURE 5, it was assumed that the material used for the body 10' was characterized by a mobility ratio $b$ greater than one. The invention is, however, not limited to this particular situation. If the material of the body 10' has a mobility ratio less than one, the hole mobility being greater than the electron mobility, the operation of the invention will be similar to t hat described above with the signs and concentration conditions reversed from those described above. In a material in which the electron and hole mobilities increase with current, the electron and hole concentrations are controlled so that the quantity $nb^2$ is greater than the quantity $p$. The Hall coefficient $R_H$ will change from a negative value to a positive value in a manner similar to the curve given in FIGURE 11, and an output signal similar to that shown in FIGURE 13*b* is produced. Where the electron and hole mobilities decrease with current, the electron and hole concentration is determined so that the quantity $nb^2$ is less than the quantity $p$. The Hall coefficient $R_H$ will change from a positive value to a negative value in a manner similar to the curve of FIGURE 8, and an output signal similar to that shown in FIGURE 10*b* is produced.

As mentioned above, the transferring of energy from the electrons and holes to the atom lattice will cause the crystal body 10′ to heat up or increase in temperature. In order to prevent injury to the crystal body 10′ due to overheating, and so on, the body 10′ may be located in a temperature control device arrangement indicated generally by the dashed box 30 in FIGURE 5. The temperature control device may appear in any one of a number of known forms. Large copper busses or similar heat transferring conductors may be connected to the ends of the body 10′ at the points 14′ and 15′, the copper busses being arranged to carry heat to a heat dissipation mechanism such as a liquid nitrogen bath. On the other hand, the crystal body 10′ may be suspended directly in a liquid nitrogen bath. It is believed to be unnecessary to discuss in detail the means for maintaining the body 10′ at a controlled temperature. Such means are described in the art as, for example, in an article "Low Temperature Electronics," Proceedings of the IRE, vol. 42, pages 408–412, February 1954.

The observed mobilities needed for the operation described in connection with the operation of the embodiment given in FIGURE 5 is most evident at the lower electric fields for material like indium antimonide, where, for example, the average eelctron mobility has been seen to change by as much as a factor of five in moderate fields, 30–40 volts per centimeter, at a temperature of 77° Kelvin. The actual conditions the crystal body 10′ would require in operation depend on the total impurity concentration and the doping. The temperature control as provided by the device 30 is available as a parameter which varies the mobilities and the electric field necessary, as well as the electron and hole concentrations. The arrangement of the invention is capable of operation at very high frequencies governed by the time required to relax the electron and hole distribution in velocity to the pertinent conditions of the applied electric field. UHF and VHF operation are possible, and microwave operation is also possible. Different circuits involving the use of wave guide coupling, and so on, would be used at the latter frequencies.

Various modifications may be made to the arrangements of the invention given in FIGURES 1 and 5 according to a particular application without departing from the spirit of the invention. By the selection of the material used for the body 10 and 10′, the concentration of impurity substances therein, and by the proper temperature control following known data and techniques, the invention may be arranged to produce an output signal of desired amplitude under given operating conditions. If the material chosen for use in the embodiments given in FIGURES 1 and 5 is chosen appropriately, the waveform of the signal supplied by the source 22, 22′ is faithfully reproduced with a frequency exactly three times the frequency of the input signal. Where numerical multiplication on a time base by three is the aim, the result can be achieved with less stringent requirements on the shape of the Hall coefficient $R_H$ versus applied magnetic field H or current I curve.

In certain applications, both the electric and magnetic fields applied to the body 10, 10′ in the embodiments given in FIGURES 1 and 5 may be varied according to an alternating current input signal, the input signals being of the the same frequency or of different frequencies. For example, where the semiconductor body exhibits a changing Hall coefficient as shown in the curves of FIGURE 2 and FIGURE 8, the application of input signals of the same frequency and phase with the magnetic field H at maximum value larger than $H_3$ and the electric current I at maximum value of $I_3$ causes the Hall voltage $V_H$ to change sign four times during each one-half cycle of the input signals. The changing magnetic field H causes the Hall coefficient $R_H$ initially negative to become positive. The current I is too small during this time interval to appreciably affect the Hall coefficient $R_H$. At the time that the magnetic field H approaches value $H_3$, the current I is beginning to affect appreciably the Hall coefficient $R_H$, returning it from its positive value back to its negative value as the current I increases, and so on. The output signal or Hall voltage $V_H$ will have a frequency five times the frequency of the input signals.

The invention is to be distinguished from semiconductor arrangements in which the operation is determined by varying the concentration of electrons and/or holes. In such devices as junction and point contact transistors, semiconductor diodes, and so on, the opesation is determined by varying the concentration of the stream of electrons and/or holes by injection according to some parameter of an incoming signal. In the present invention, the operation is determined by changing the electron and hole mobilities according to a varying applied electric or magnetic field, the concentrations of electrons and holes remaining essentially constant. No injection of electrons or holes occurs, the operation depending upon the concentration of electrons and holes present in the crystal body.

A frequency multiplier is disclosed which is simple in operation. Since no tuned circuits are required, the frequency multiplier is capable of operation over a relatively wide range of frequencies without the necessity of retuning operations. The complexities involved in tuning such a circuit for each change in input frequency are avoided. A minimum number of parts are requried, making the invention particularly suitable for use in applications where size and weight are important factors. Since the output signal is in sync with the driving signal in that the output signal crosses the zero axis simultaneously with the driving signal, the invention provides for a suitable choice of the other circuit components to be operated in connection therewith.

What is claimed is:

1. A frequency multiplier comprising, in combination, a body of semiconductor material in which both holes and electrons contribute to conductivity and in which the mobility of said electrons is greater than the mobility of said holes, the concentration of mobile electrons times the square of the ratio of said electron mobility to said hole mobility being greater than the concentration of mobile holes in said material, said body exhibiting a characteristic dependence of an output signal taken across one axis thereof on an electric and magnetic field applied to said body, means for applying to said body a constant electric field, means for applying to said body a magnetic field varying in value according to the frequency of an alternating current input signal to cause said ratio to remain greater than one but to change as a function of the variations in said magnetic field, the electron and hole concentrations in said body being determined so that the change in said ratio is large enough to cause the mobile electron concentration times the square of said ratio to become less than the mobile hole concentration periodically according to said frequency, whereby said output signal has a frequency equal to the frequency of said input signal multiplied by a given factor.

2. A frequency multiplier comprising, in combination, a body of semiconductor material in which both holes and electrons contribute to conductivity and in which the mobility of said electrons is less than the mobility of said holes, the concentration of mobile electrons times the square of the ratio of said electron mobility to said hole mobility being less than the concentration of mobile holes in said material, said body exhibiting a characteristic dependence of an output signal taken across one axis thereof on an electric and magnetic field applied to said body, means for applying to said body a constant electric field, means for applying to said body a magnetic field varying in value according to the frequency of an alternating current input signal to cause the said ratio to remain less than one but to change as a function of the variations in said magnetic field, the electron and hole concentrations in said body being determined so that the change in said ratio is large enough to cause the mobile electron concentration times the square of said ratio to become greater than the mobile hole concentration periodically according to said frequency, whereby said output signal has a frequency equal to the frequency of said input signal multiplied by a given factor.

3. A frequency multiplier comprising, in combination, a body of semiconductor material in which electrons and holes contribute to conductivity with the electron mobility greater than the hole mobility and in which said electron mobility and said hole mobility increase with an increase in an electric field applied to said body, the concentration of the mobile electrons times the square of the ratio of electron mobility to hole mobility being less than the concentration of mobile holes in said material, said body exhibiting a characteristic dependence of an output signal taken across one axis thereof on an electric and magnetic field applied to said body, means for applying to said body a constant magnetic field, means for applying to said body an electric field varying in value according to the frequency of an alternating current input signal to cause said ratio to remain greater than one but to change as a function of the variations in said electric field, the concentration of electrons and of holes in said body being determined so that the change in said ratio is large enough to cause the mobile electron concentration times the square of said ratio to become greater than the mobile hole concentration periodically according to said frequency, whereby said output signal has a frequency equal to the frequency of said input signal multiplied by a given factor.

4. A frequency multiplier comprising, in combination, a body of semiconductor material in which electrons and holes contribute to conductivity with the electron mobility less than the hole mobility and in which the electron mobility and hole mobility increase with an increase in an electric field applied to said body, the concentration of mobile electrons times the square of the ratio of electron mobility to hole mobility being greater than the concentration of mobile holes in said material, said body exhibiting a characteristic dependence of an output signal taken across one axis thereof on an electric and magnetic field applied to said body, means for applying to said body a constant magnetic field, means for applying to said body an electric field varying in value according to the frequency of an alternating current input signal to cause said ratio to remain less than one but to change as a function of the variations in said electric field, the concentration of electrons and holes in said body being determined so that the change in said ratio is large enough to cause the mobile electron concentration times the square of said ratio to become less than the concentration of mobile holes periodically according to said frequency, whereby said output signal has a frequency equal to the frequency of said input signal multiplied by a given factor.

5. A frequency multiplier comprising, in combination, a body of semiconductor material in which electrons and holes contribute to conductivity with the electron mobility greater than the hole mobility and in which the electron mobility and hole mobility decrease with an increase in an electric field applied to said body, the concentration of mobile electrons times the square of the ratio of electron mobility to hole mobility being greater than the concentration of mobile holes in said material, said body exhibiting a characteristic dependence of an output signal taken across one axis thereof on an electric and magnetic field applied to said body, means for applying a constant magnetic field to said body, means for applying to said body an electric field varying in value according to the frequency of an alternating current input signal to cause said ratio to remain greater than one but to change as a function of the variations in said electric field, the concentration of electrons and holes in said body being determined so that the change in said ratio is large enough to cause the mobile electron concentration times the square of said ratio to become less than the concentration of mobile holes periodically according to said frequency, whereby said output signal has a frequency equal to the frequency of said input signal multiplied by a given factor.

6. A frequency multiplier comprising, in combination, a body of semiconductor material in which electrons and holes contribute to conductivity with the electron mobility less than the hole mobility and in which the electron mobility and hole mobility decrease with an increase in an electric field applied to said body, the concentration of mobile electrons times the square of the ratio of electron mobility to hole mobility being less than the concentration of mobile holes in said material, said body exhibiting a characteristic dependence of an output signal taken across one axis thereof on an electric field and magnetic field applied to said body, means for applying a constant magnetic field to said body, means for applying to said body an electric field varying in value according to the frequency of an alternating current input signal to cause said ratio to remain less than one but to change as a function of the variations in said electric field, the concentration of electrons and holes in said body being determined so that the change in said ratio is large enough to cause the mobile electron concentration times the square of said ratio to become greater than the concentration of mobile holes periodically according to said frequency, whereby said output signal has a frequency equal to the frequency of said input signal multiplied by a given factor.

7. A frequency multiplier comprising, in combination, a body of semiconductor material in which both holes and electrons contribute to conductivity and in which the mobility of said electrons is greater than the mobility of said holes, the concentration of mobile electrons times the square of the ratio of the electron mobility to the hole mobility being greater than the hole concentration in said material, said body exhibiting a characteristic dependence of an output signal taken across one axis thereof on an electric and magnetic field applied to said body, means for applying to said body an electric field and means for applying to said body a magnetic field with one of said fields being varied in value according to the frequency of an alternating current input signal to cause said ratio to remain greater than one but to change as a function of the variations in said one field, said body having electron and hole concentrations so that the change in said ratio is large enough to cause the mobile electron concentration times the square of said ratio to become less than the mobile hole concentration periodically according to said frequency, whereby said output signal has a frequency equal to the frequency of said input signal multiplied by a given factor.

8. A frequency multiplier comprising, in combination, a body of semiconductor material in which both holes and electrons contribute to conductivity and in which the mobility of said electrons is less than the mobility of said holes, the concentration of mobile electrons times the square of the ratio of said electron mobility to said hole mobility being less than the concentration of mobile holes in said material, said body exhibiting a characteristic dependence of an output signal taken across one axis thereof on an electric and magnetic field applied to said body, means for applying to said body an electric field and means for applying to said body a magnetic field with one of said fields varying in value according to the frequency of an alternating current input signal to cause said ratio to remain less than one but to change according to the variations in said one field, said body having electron and hole concentrations so that the change in said ratio is large enough to cause the mobile electron concentration times the square of said ratio to become greater than the mobile hole concentration periodically according to said frequency, whereby said output signal has a frequency equal to the frequency of said input signal multiplied by a given factor.

9. A frequency multiplier comprising, in combination, a body of semiconductor material in which both holes and electrons contribute to conductivity and in which the mobility of the electrons is greater than the mobility of said holes, the concentration of mobile electrons times the square of the ratio of electron mobility to hole mobility being greater than the concentration of mobile holes in said material, means for applying a constant electric field across one axis of said body, means for applying along a second axis of said body perpendicular to said first axis a magnetic field varying in value according to the frequency of an alternating current input signal, the application of said magnetic field to said body causing said ratio to remain greater than one but to change as a function of the variations in said magnetic field, said body having electron and hole concentrations so that the change in said ratio is large enough to cause the mobile electron concentration times the square of said ratio to become less than the mobile hole concentration periodically according to said frequency, and means coupled across a third axis of said body perpendicular to said first axis and said second axis and responsive to a Hall voltage appearing across said third axis and having a frequency three times the frequency of said input signal.

10. A frequency multiplier comprising, in combination, a body of semiconductor material in which both holes and electrons contribute to conductivity and in which the mobility of the electrons is less than the mobility of said holes, the concentration of mobile electrons times the square of the ratio of electron mobility to hole mobility being less than the concentration of mobile holes in said material, means for applying a constant electric field across one axis of said body, means for applying along a second axis of said body perpendicular to said first axis a magnetic field varying in value according to the frequency of an alternating current input signal, the application of said magnetic field to said body causing said ratio to remain less than one but to change as a function of the variations in said magnetic field, said body having electron and hole concentrations so that the change in said ratio is large enough to cause the mobile electron concentration times the square of said ratio to become greater than the mobile hole concentration periodically according to said frequency, and means coupled across a third axis of said body perpendicular to said first axis and said second axis and responsive to a Hall voltage appearing across said third axis and having a frequency three times the frequency of said input signal.

References Cited in the file of this patent

UNITED STATES PATENTS

| | | |
|---|---|---|
| 2,464,807 | Hansen | Mar. 22, 1949 |
| 2,736,822 | Dunlap | Feb. 28, 1956 |
| 2,830,251 | Tiley | Apr. 8, 1958 |
| 2,852,732 | Weiss | Sept. 16, 1958 |
| 2,862,189 | Kuhrt | Nov. 25, 1958 |

FOREIGN PATENTS

| | | |
|---|---|---|
| 687,130 | Great Britain | Feb. 4, 1953 |